United States Patent [19]
Itzhak

[11] Patent Number: 5,794,567
[45] Date of Patent: Aug. 18, 1998

[54] CLEANABLE OBSERVATION CAGE FOR REPTILES ESPECIALLY SNAKES

[76] Inventor: Roni Itzhak, 15435 78th Pl. North, Loxahatchee, Fla. 33470

[21] Appl. No.: 877,440

[22] Filed: Jun. 17, 1997

[51] Int. Cl.[6] .................................................. A01K 1/00
[52] U.S. Cl. ........................ 119/416; 119/458; 119/462
[58] Field of Search .............................. 119/462, 463, 119/458, 419, 480, 482, 245, 248, 416

[56] References Cited

U.S. PATENT DOCUMENTS

| | | | |
|---|---|---|---|
| 1,532,486 | 4/1925 | Harrington | 119/482 |
| 1,558,899 | 10/1925 | Leon | 119/462 |
| 1,618,404 | 2/1927 | Berry | 119/482 |
| 1,944,566 | 1/1934 | Meindl | 119/462 |
| 2,769,426 | 11/1956 | Bromlay | 119/462 |
| 2,881,733 | 4/1959 | Young, Jr. et al. | 119/419 |
| 3,269,578 | 8/1966 | Lewis | 119/246 |
| 4,495,892 | 1/1985 | Jodar et al. | 119/482 |
| 4,586,463 | 5/1986 | Braeuner | 119/462 |
| 4,788,938 | 12/1988 | Davenport | 119/242 |
| 5,003,923 | 4/1991 | Morgan | 119/482 |
| 5,092,277 | 3/1992 | Baillie et al. | 119/482 |
| 5,135,400 | 8/1992 | Ramey | 119/482 |

FOREIGN PATENT DOCUMENTS

| | | | |
|---|---|---|---|
| 2690605 | 11/1993 | France | 119/482 |
| 190957 | 8/1964 | Sweden | 119/482 |

*Primary Examiner*—Paul J. Hirsch
*Attorney, Agent, or Firm*—Malin, Haley, DiMaggio & Crosby, PA

[57] ABSTRACT

A small security cage for housing a pet reptile, such as a snake, lizard, or amphibian, and observation of the reptile. The cage includes a floor wall, side walls, a rear wall, a transparent front wall for viewing and a removable lower tray for cleaning the cage. An openable top door includes a wire mesh for ventilation and access to the reptiles contained therein. A heating element, light, and thermostat can be included to maintain the environment suitable for a desired species.

7 Claims, 5 Drawing Sheets

CLEANABLE OBSERVATION CAGE FOR REPTILES ESPECIALLY SNAKES

BACKGROUND OF THE INVENTION

1. Field of the Invention

This invention relates to a small observation, security cage for pet reptiles, especially snakes, that is easy to clean and highly secure, and that includes a waterproof tray and that has thermal control features for accommodating a cold-blooded creature.

2. Description of the Background Art

U.S. Pat. No. 3,742,909, issued Jul. 3, 1973 to Yellin, shows a cage for pets and the like. The cage shown includes rigid linear wires and a removable tray. One of the problems with this cage is that it is not suitable for reptiles because there is no solid bottom to the structure of the cage, so that when the cleaning tray is removed for cleaning, the reptile could escape through the bottom. Typically, cages for animals or birds also are not suitable for reptiles, because it is too difficult to control temperature within a cage. Reptiles often need a heating element, such as a lamp or heating rock, to maintain body temperatures at desired time periods in an environment having a preselected temperature (depending on the species), since they are cold-blooded creatures that require external heating to achieve proper bodily functions.

The present invention overcomes problems in the prior art by providing an observation cage that includes a clear glass or plastic frame panel and a plastic waterproof tray that can hold water for the reptile and be easily removed and cleaned, within a fully enclosed cage.

The present invention also includes a ventilation and light transmittal screen as a top, movable door, so that the proper heating lamp for the creature can be disposed at a predetermined location manually to allow the proper disposition of light and heat within the cage for the reptile. With the cage in accordance with the present invention, snakes, lizards, and amphibians can easily be healthfully kept in a very cleanable, yet observable, cage. In addition, tree branches or simulated tree branches may be permanently affixed to the rigid back or side walls of the cage for practical purposes to allow the reptile to have a place to nest or be supported when the cage is being cleaned, while at the same time adding aesthetics to the cage.

The present invention also includes a top cage door aperture for receiving an electrical cord to allow a heating rock to be disposed properly within the cage if desired.

With the use of the present invention, the reptile is easily observable through a window-like front wall, while being maintained healthfully in a cage that includes a waterproof tray that is easily cleaned, and easy access to the animal from the top, while allowing for proper lighting.

SUMMARY OF THE INVENTION

A domestic cage for pet snakes, lizards, and amphibians that allows for secure retention of the pet with excellent observation and easy cleaning of the cage without escape of the pet.

The improved cage includes three rigid, flat, vertical walls (two sides and one back) which may be translucent or opaque, and a rigid, flat, bottom floor permanently attached to the three vertical walls, and a front wall that includes a clear plastic or glass plate from the top to almost the bottom wall. The front wall terminates in a pair of horizontal support braces connecting parallel side walls together, forming a rigid structure. A small opening exists between the floor and the lower horizontal front brace. The glass or plastic wall is clear or transparent so that one can readily see through the front wall of the cage to observe the reptile. The rigid, horizontal support braces may be made of wood or plastic, and of the same material as the side, vertical walls, the back vertical wall, and the floor.

A slidable, rectangular, removable tray (the size of the floor) is formed of four vertical side walls joined together in a rectangular array and a transparent or translucent or clear plastic, waterproof floor in the tray are joined together to form a waterproof structure that will retain water to prevent leakage. The tray side walls are sized vertically in height to snugly fit against the bottom of the floor and the horizontal brace along the front wall so that it can still slide in and out, such that in the closed position, the entire tray is disposed within the cage, except for at least one handle that protrudes from the front. For the cleaning position, the tray is manually pulled out to a position where the back wall of the tray is in the plane of the front wall and the horizontal brace. A pivotal fastener may be used to lock the tray in place so that the tray cannot be moved by the creature or accidentally removed. Preferably the tray may be made of a clear plastic material that is both waterproof and can be adhesively sealed along the wall joints or molded as one piece to prevent water from leaking out of the tray. The back end wall of the tray fits snugly against the brace, thus preventing the animal from leaving the cage while the tray is in an extended, outward position.

In the preferred embodiment, the tray may be anywhere from 1 to 7 inches in height, and the length of the tray will be such that the tray bottom covers the inside area of the floor of the cage.

The top wall frame is attached by hinges to the back wall to form a pivotal door having a wire mesh interior portion, providing an opening that allows access into the cage for adding, removing, or positioning of the reptile in the cage. The wire mesh provides ventilation for the cage, allowing air flow in and out of the cage through the wire mesh. In addition, the wire mesh also allows for direct support for a lamp, having a predetermined light wattage, to be placed directly on top of the wire mesh, to allow illumination of the interior of the cage so that the reptile can receive sufficient heat and warmth from the radiation from the light bulb to raise its body temperature to the best range for the particular species. Note that the metal lamp reflector housing can be placed along the metal wire mesh because the wire mesh covers most of the top of the cage. By positioning the light bulb at one side of the cage, this allows the creature to move freely from a warmer zone to a cooler zone to find an accommodating temperature.

In an alternate embodiment, an electrically powered heating rock can be placed inside the cage. The top frame member of the cage also includes a small aperture to receive an electrical cord to be disposed through the top opening of the cage to power the heated rock that may be controlled by a thermostat or timer for heating one portion of the cage. The top screen door also includes a manually actuated support brace to hold the door open in a particular predetermined position.

The window in the front of the cage provides a large viewing area, while still safely enclosing the reptile. Inside the cage, a tree or bush branch or simulated branch may be mounted on the back or side walls that allows for aesthetic realism of the environment for the reptile and an elevated support for the reptile to rest, especially during the time when the bottom tray may be moved to its cleaning position.

The top wire mesh door includes a large, rectangular mesh vent, reaching substantially to all sides of the cage, with a small portion being the actual frame itself that supports the door and the top of the cage. A fastener is included that rotates to lock the top of the cage door in place.

Thermal control of the environment for the cage may include a thermostat within the cage that is connected to a heat lamp or heat rock, that is set for a predetermined temperature, that turns heating elements on and off to provide a proper temperature environment for the reptile. This is extremely important since reptiles cannot live or function below certain predetermined temperatures, so that it is important that proper heat be maintained for the reptiles.

To utilize the present invention, the tray is in its closed position inside the cage and water may be introduced into the tray, either directly or within a separate dish, for use by the reptile. Thus, the bottom of the cage is waterproof because of the tray. Therefore, the cage bottom itself does not need to be waterproof. The reptile is introduced into the cage and the top door is closed. A heat source, such as a lamp, is chosen and is placed on the wire mesh at one particular side of the cage, so that portions of the cage are more heated than others, with the light being allowed to shine down through. A thermostat may be maintained in the cage for turning the heat lamp on and off as required.

To clean the cage, one could grasp and position the reptile on the simulated or real branch that is on the back wall of the cage. The reptile is supported above the tray. The tray can then be moved forward to a position where the back wall of the tray occupies the space between the lower horizontal brace and the bottom floor of the cage. In this position, the tray may be cleaned without fear of escape by the reptile, or the tray can be quickly removed and dumped, wiped out, and put back in place. The opening is quite restricted because of the lower cross-brace coming across the tray front.

Once the tray has been cleaned, it is then inserted back into the cage and the cycle is complete. In the alternative embodiment, a heat rock may be placed in the tray and in the cage, with the cord being disposed down through the door frame aperture.

It is an object of this invention to provide an improved reptile cage, especially for safely securing pet reptiles at home, such as snakes, amphibians, or lizards, that is easily cleaned, but highly secure to keep the reptiles in, and that is environmentally adapted to provide the proper heating and ventilating necessary for maintaining reptiles.

It is another object of this invention to provide an improved reptile cage that includes a top wire screen or mesh door for ventilation and heating, using an incandescent light bulb that can be positioned strategically along the top and placed against the wire mesh safely for proper thermal heating of the reptile inside. A thermostat may be maintained inside the cage that is connected to an electrical circuit that can turn the light bulb on and off as desired.

It is another object of this invention to provide an improved reptile cage that allows for vivid observation of the reptile through a large, clear front wall with sufficient security to keep the reptile within the cage at all times, even when the tray is removed for cleaning.

In accordance with these and other objects which will become apparent hereinafter, the instant invention will now be described with particular reference to the accompanying drawings.

DESCRIPTION OF THE PREFERRED EMBODIMENTS

Figure 1:
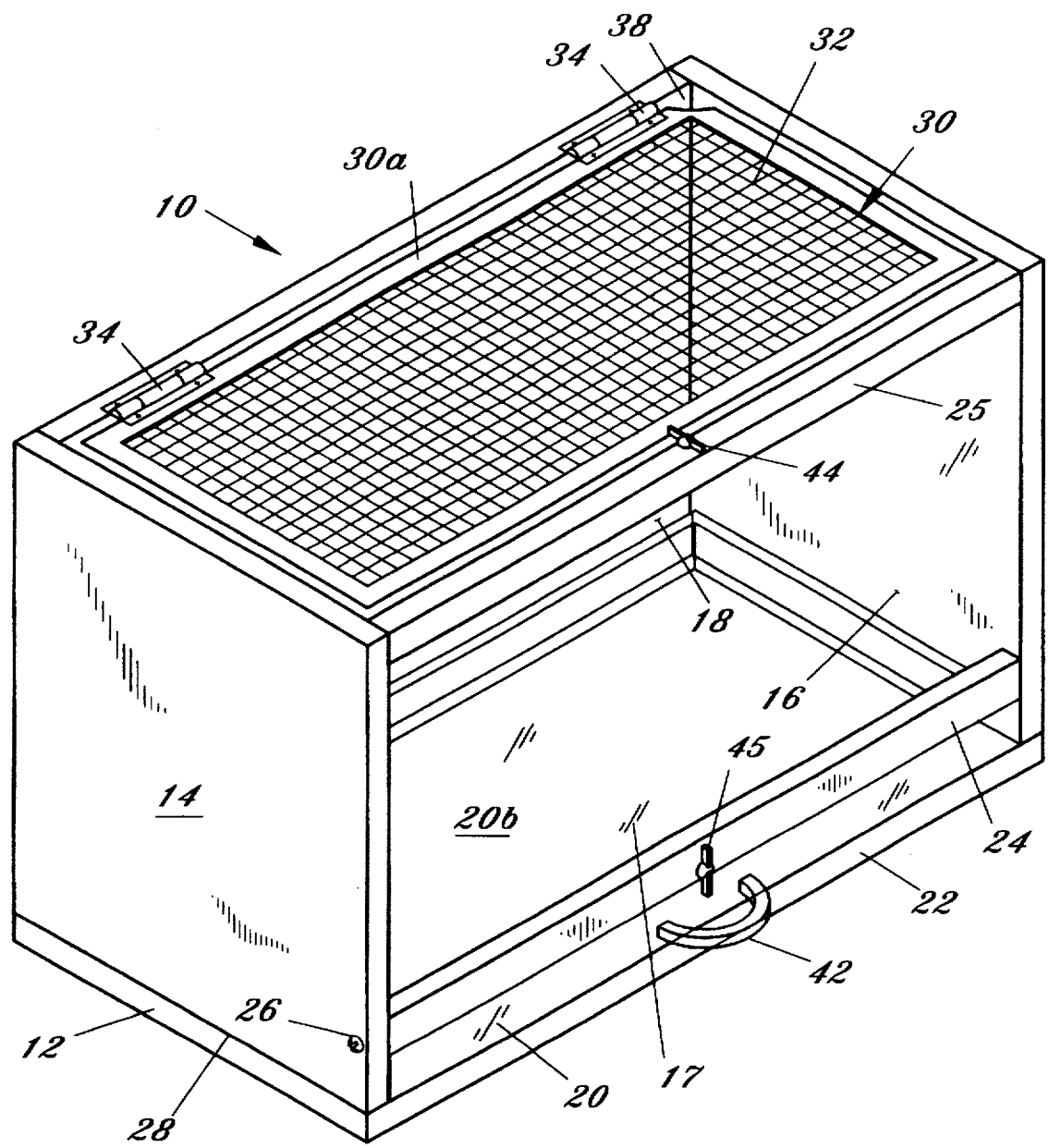
FIG. 1 shows a perspective view from the front of the cage in accordance with the present invention, with the top door closed and the tray closed.

Referring now to the drawings, and in particular FIG. 1, the present invention is shown generally at 10, comprised of a rigid, planar bottom wall 22, permanently and rigidly affixed to three rigid side walls 14, 16, and 18, which may be attached by adhesive 28 or threaded fasteners 26. The bottom wall 22 is typically substantially flat, made of a rigid material such as wood, plastic, or metal, as are the vertical side walls 14, 16, and 18 attached thereto.

The front wall 17 is a thin, planar pane of glass or thin sheet of transparent plastic, such as plexiglass, that is rigid and occupies substantially the full front area of the cage, terminating and connected in a sealed manner to rigid cross bars 24 and 25 (made of wood or plastic) that are fastened to the sidewalls 14 and 16.

A withdrawable, slidable, clear plastic tray 20 is mounted beneath the horizontal supporting brace 24 and is described in greater detail below. A handle 42 allows the tray 20 to be manually moved from its position inside cage 10 to a cleaning position substantially outside of cage 10, as described herein.

The cage includes a movable top door 30 that has a supporting frame 30a that can be attached to vertical wall 18 by hinges 34. When open, door 30 can include support arm 30b to maintain door 30 in the open position. When closed, door 30 rests on at least one support members 36 which are connected to the vertical side walls 14 and 16, thus forming a rigid polyhedron enclosure. The support members 36 may be made of wood, plastic, or metal and are permanently attached to the vertical walls. Top door 30 which includes a rigid frame 30a attached to a metal wire mesh or screen 32 and occupies most of the area inside vertical walls 14, 16, and 18. The purpose of the wire mesh screen is to permit ventilation for the reptile within, and to provide a horizontal support surface for supporting a light bulb or heating element that provides radiant heat to a reptile in the cage in a designated area.

It is important to provide thermal control and heat addition within the cage to insure that a proper temperature for the desired species is achieved in the cage, which is necessary for the health of reptiles, including snakes. By having a wire mesh screen at the top, a light bulb and light reflector housing can be positioned directly on the metal screen 32 without danger of fire, while allowing direct illumination through the wire screen along a separate portion of the cage, so that the reptile in the cage can be at one end directly in the rays of the light for heating purposes, or seek a cooler area in the cage away from the light.

The cage may also contain a thermostat that allows for temperature control by turning the light on and off as desired by the thermostat. A pair of conventional hinges 34 are attached to the door frame 30a so that access to the cage can be gained from the top to allow the pet owner to add or remove reptiles to the cage as desired.

Figure 2:
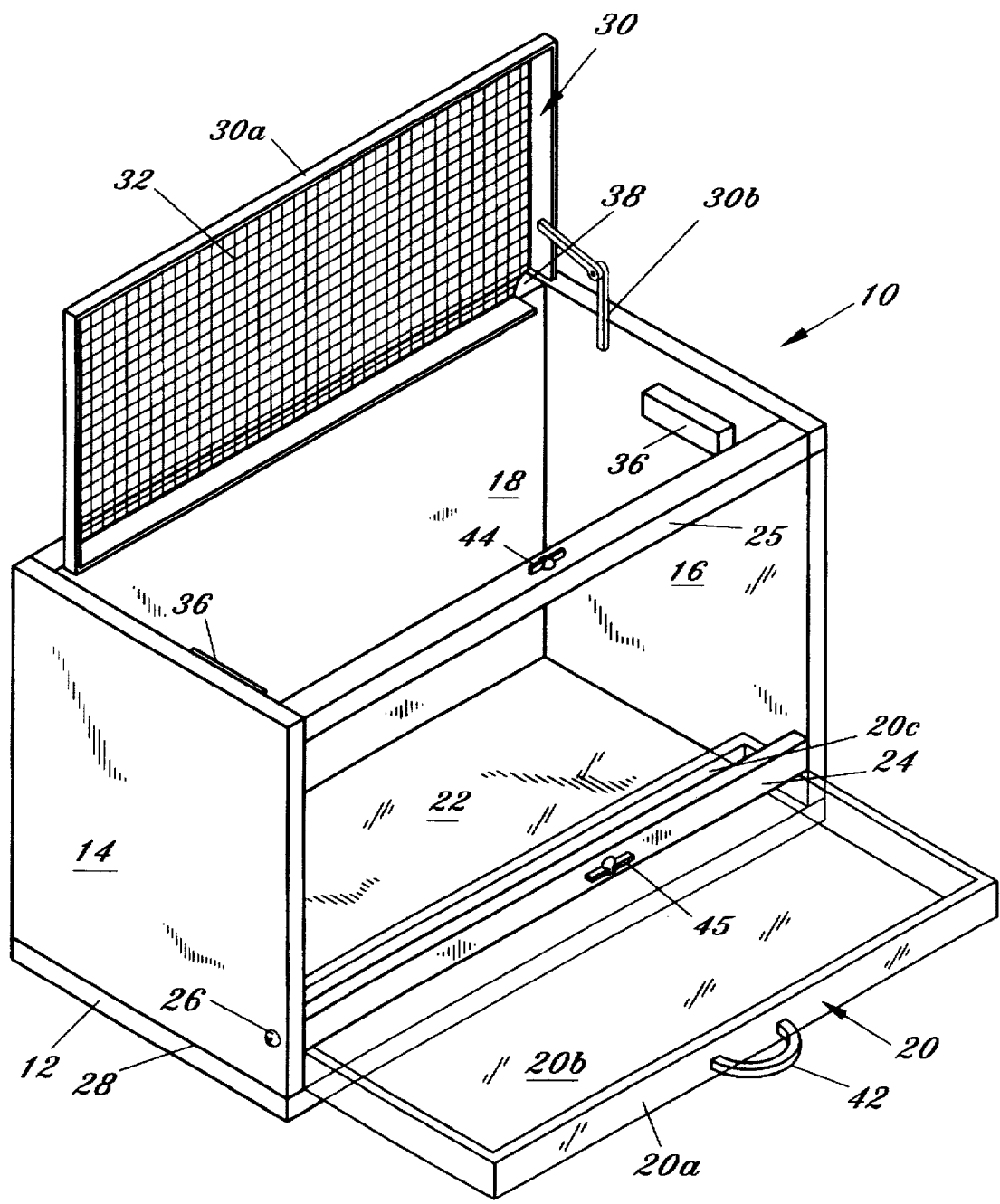
FIG. 2 shows the same perspective view from the front as in FIG. 1, including the top mesh door being open and the tray open.

Referring now to FIG. 2, the cage 10 is shown with the mesh screen 32 and door 30 raised to an open position. Note that the frame 30a has a notched portion 38 in one corner, which is sized to be small enough to prevent a reptile from leaving the cage, but large enough to permit an electrical appliance, such as a heating rock, to be placed directly in the cage with the electrical cord disposed through notch 38 in frame 30a. A fastener 44 which is rotatable is used to lock the cage door 30 in place when desired.

The service tray 20 moved to a cleaning position by handle 42 manually. A fastener 45, similar to fastener 44, is used to lock tray 20 in place. The bottom wall or floor 22 of the cage and the back wall 20c of the tray are visible. The tray 20 includes a back wall 20c that is vertical, side walls 20a that are all vertical, attached together with a bottom wall 20b in a manner that allows the tray to be waterproof. The wall structure, as described for the tray may be molded as one plastic piece or glued together in a rectangular polyhedron shape and snugly but slidably fit between the bottom wall 22 of the cage and the cross brace 24 so that the reptile cannot escape when the tray is either in a cleaning position as shown in FIG. 2 when tray back wall 20c is abutted in line with cross brace 24, or when the tray is in a closed position, which also has a locking device 45. Note that with the total enclosure of the cage, including the bottom floor wall 22, even when the tray 20 is withdrawn so that the back wall of the tray 20c abuts or is lined up with brace 24, the reptile cannot escape through the bottom of the cage. The structure shown provides essentially a double bottom to the cage, one provided by the tray 20 and the other provided by the floor bottom wall 22. The tray structure 20 and side walls 20a, back wall 20c, and bottom wall 20b may all be made of a plastic material, such as plexiglass, that is clear and allows for easy cleaning, and is waterproof. However, other materials may be utilized.

Figure 3:
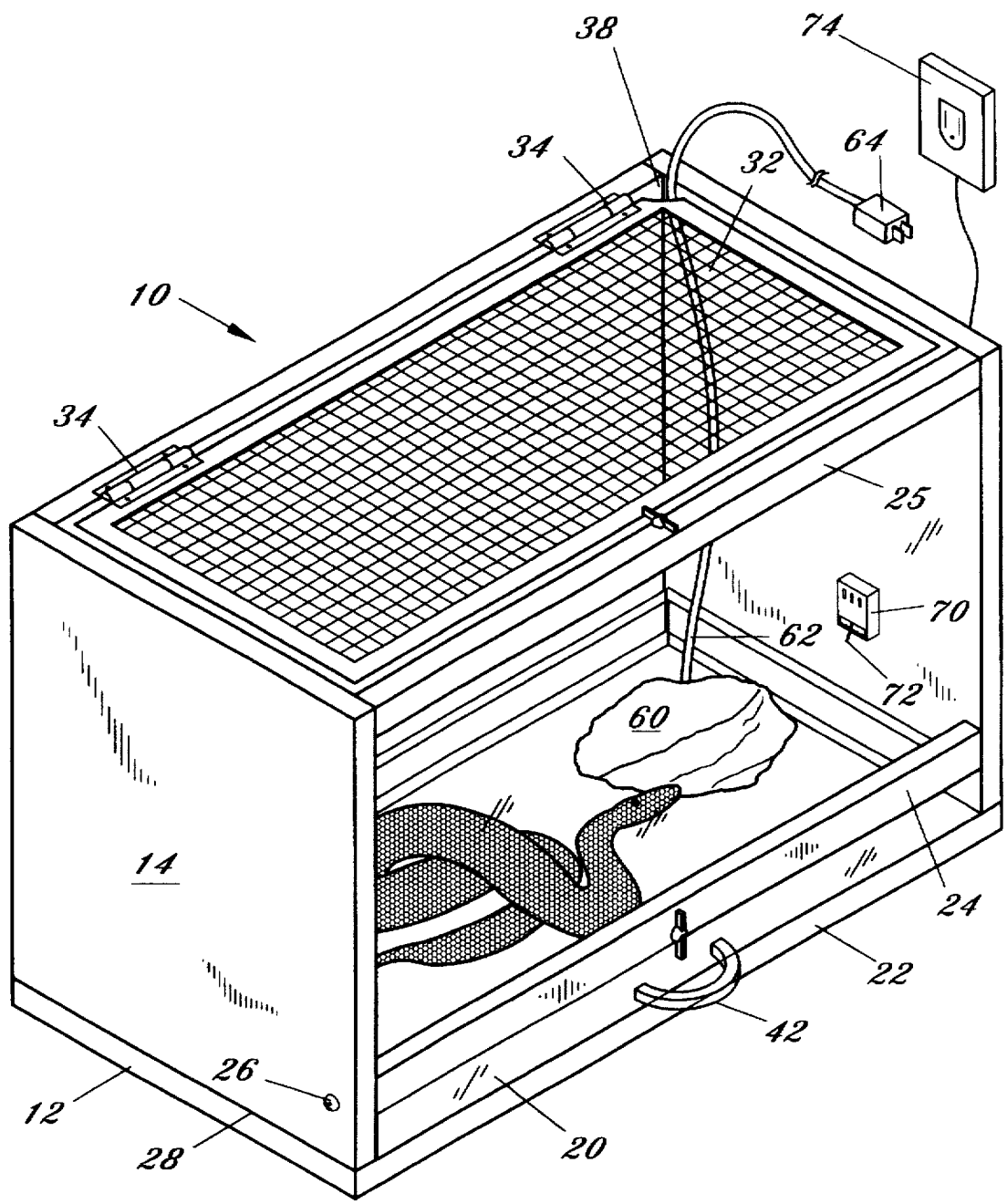
FIG. 3 shows a perspective view from the front of the present invention that includes a heating element and a thermostat.

FIG. 3 shows the cage 10 with a heated rock 60 connected by electrical cord 62 through notch 38 in the top door 30, which allows the heated rock to be disposed in the cage with the reptile. By having a notch through the uppermost door frame, the rock can be conveniently placed in the cage with the electrical cord supported vertically if the notch is small enough to accommodate the diameter of the cord, while at the same time allowing the owner to move the heated rock to any desired location within the cage.

FIG. 3 shows a thermostat 70 mounted inside the cage 10 which has a control arm 72 that allows for manually setting the temperature shown on a scale on the thermostat which is connected to a control box 74, which allows the heated rock 60 to be plugged in by plug 64 so that the heated rock 60 can be turned on and off to control the temperature in the cage as necessary for the reptile's well-being.

Figure 4:
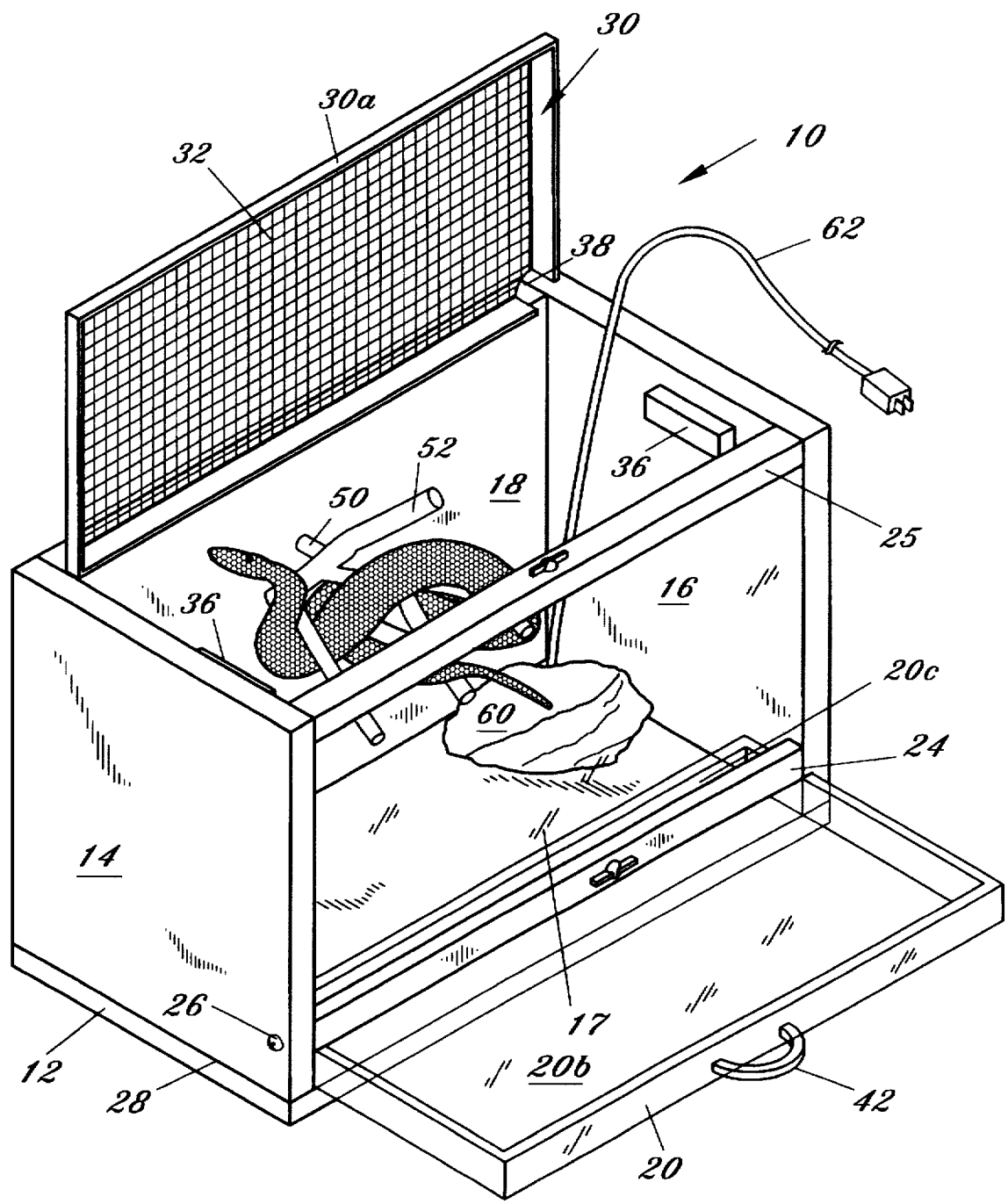
FIG. 4 shows a perspective view of the present invention, with the tray in an open position, the top door in an open position, and a branch that is used to support a snake, with the heating element in the cage.

FIG. 4 shows a simulated or actual tree branch 52 permanently affixed to back wall 18 by connector 50 which may be a threaded connector or fastener that will rigidly support the simulated tree branch 52. The branch provides the reptile a support platform above the floor, especially when tray 20 is moved to a cleaning position. The reptile owner can place the reptile on the tree limb 52 during the cleaning operation.

Figure 5:
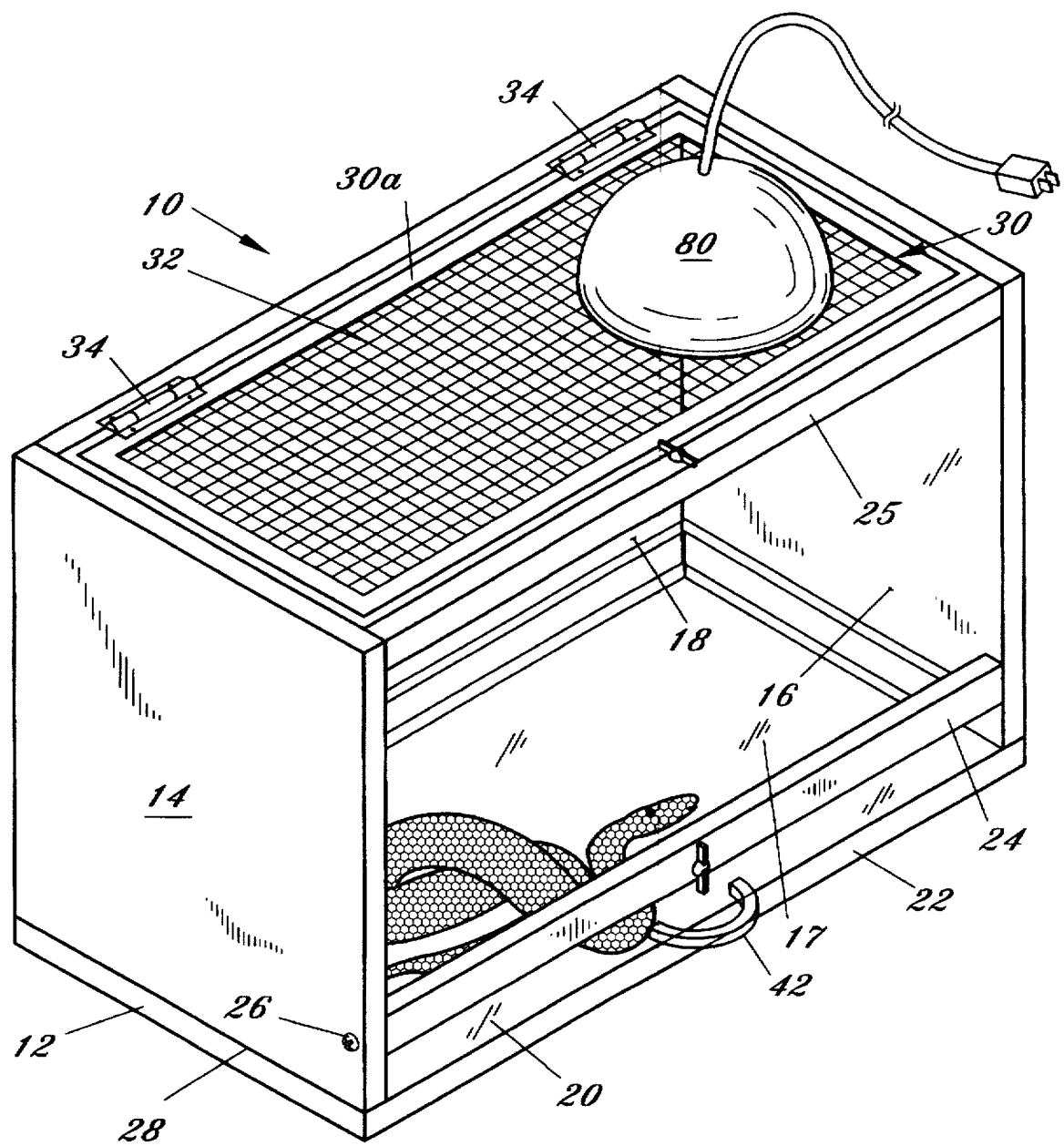
FIG. 5 shows an alternate embodiment of the invention shown in a perspective view in which the heating element is an incandescent lamp mounted on top of the wire screen or mesh door.

FIG. 5 shows the cage 10 with an incandescent light and reflector housing 80 mounted on the mesh platform 32 which allows for light radiation on the reptile in the cage.

The mesh or screen wire is metal and spaced approximately one-quarter to one-half inch apart, depending on the size of the cage, in ventilation holes to permit both air and light to pass through, and resists melting or fire damage, and provides a platform that allows illumination to pass through the wire mesh without danger of overheating the platform. Also, the light 80 may be moved manually to any side of the cage to a desired position by the owner.

In summary, the reptile cage in accordance with the present invention provides for an easily cleanable, waterproof tray that slides from a closed position to an open position, which still prevents the reptile from escaping, while providing a wide, clear, forward window for constant unobtrusive observation of the reptile inside. The top of the cage provides both ventilation and a thermal support screen for illumination for heating the reptile. The inside of the cage is readily accessible through a top door, and also includes thermal adjustment using the thermostat and control devices for heating devices, such as a thermal rock. Finally, the cage can include an actual or simulated tree limb that allows intermediate raised support for the reptile, especially during the cleaning operation when the tray is moved.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A reptile cage for securely housing a domestic reptile pet, such as a snake, amphibian, or lizard in a controlled environment, comprising:

a rigid, planar floor wall;

first and second parallel, vertical side walls and a back wall, firmly attached to the floor wall about its edges, forming side and back walls;

a clear, light-transmissive front wall attached to said side walls, not engaging said floor;

a movable, waterproof bottom tray, movable from a closed position inside the cage to an open position outside said cage, mounted movably between said front wall and said floor wall;

a top door having a wire screen and door frame connected to said back wall;

said floor wall, said first and second parallel vertical side walls, said back wall, said front wall, said movable bottom tray and said top door defining a living space for the domestic reptile pet, the pet being removable through said top and through said movable bottom tray when in said open position, said bottom tray forming part of said living space for the domestic reptile pet when in said closed position, wherein removal of the domestic reptile pet and cleaning of said living space is facilitated by moving said movable bottom tray to said open position.

2. A reptile cage as in claim 1, including:

a cross brace connected to said side walls and said front wall, said cross brace mounted a predetermined distance horizontally above said floor wall;

said movable, waterproof bottom tray, movable from a closed position inside the cage to an open position outside said cage, mounted movably between said cross brace and said floor wall.

3. A reptile cage as in claim 1, including:

means for accessing said cage through a door frame aperture for an electrical appliance cord mounted within said top wall frame.

4. A reptile cage as in claim 1, including:

thermal control means mounted within said cage for controlling the temperature inside the cage.

5. A reptile cage as in claim 1, including:

reptile body support means simulating a tree branch connected to at least one interior wall surface for supporting a reptile.

6. A reptile cage as in claim 1, including:

a light means mounted on said screen to illuminate said cage interior.

7. A reptile cage as in claim 1, wherein said movable waterproof bottom tray is removable.

* * * * *